US012656512B2

(12) United States Patent
Ishizawa et al.

(10) Patent No.: US 12,656,512 B2
(45) Date of Patent: Jun. 16, 2026

(54) COAXIAL CABLE AND RADIATION DETECTOR

(71) Applicant: CANON ELECTRON TUBES & DEVICES CO., LTD., Otawara (JP)

(72) Inventors: Kazuya Ishizawa, Otawara (JP); Noriyuki Hikida, Otawara (JP)

(73) Assignee: CANON ELECTRON TUBES & DEVICES CO., LTD., Otawara (JP)

( * ) Notice: Subject to any disclaimer, the term of this patent is extended or adjusted under 35 U.S.C. 154(b) by 197 days.

(21) Appl. No.: 18/739,639

(22) Filed: Jun. 11, 2024

(65) Prior Publication Data

US 2024/0329262 A1      Oct. 3, 2024

Related U.S. Application Data

(63) Continuation of application No. PCT/JP2022/011182, filed on Mar. 14, 2022.

(30) Foreign Application Priority Data

Dec. 13, 2021    (JP) ................................. 2021-201436

(51) Int. Cl.
| | |
|---|---|
| *G01T 3/00* | (2006.01) |
| *H01B 7/02* | (2006.01) |
| *H01B 7/28* | (2006.01) |
| *H01B 11/18* | (2006.01) |

(52) U.S. Cl.
CPC ................ *G01T 3/008* (2013.01); *G01T 3/00* (2013.01); *H01B 7/02* (2013.01); *H01B 7/28* (2013.01); *H01B 11/18* (2013.01); *Y02E 30/30* (2013.01)

(58) Field of Classification Search
CPC .. G01T 3/00; G01T 3/008; H01B 7/02; H01B 7/28; H01B 11/18; Y02E 30/30
See application file for complete search history.

(56) References Cited

U.S. PATENT DOCUMENTS

| | | | | | |
|---|---|---|---|---|---|
| 3,780,205 | A | * | 12/1973 | Aupoix | ................. F16L 59/141 |
| | | | | | 505/885 |
| 2016/0336697 | A1 | | 11/2016 | Zimmerhaeckel et al. | |
| 2019/0081448 | A1 | | 3/2019 | Zimmerhaeckel et al. | |
| 2022/0200217 | A1 | * | 6/2022 | Gonzalez | ............. H01R 13/521 |

FOREIGN PATENT DOCUMENTS

| | | |
|---|---|---|
| CN | 112698381 A | 4/2021 |
| DE | 89 13 623 U1 | 3/1991 |
| JP | 55-67674 A | 5/1980 |
| JP | 56-46478 A | 4/1981 |
| JP | 2000-187079 A | 7/2000 |

OTHER PUBLICATIONS

International Search Report issued May 17, 2022 in PCT/JP2022/011182 filed on Mar. 14, 2022, 3 pages.

* cited by examiner

*Primary Examiner* — Mark R Gaworecki

(74) *Attorney, Agent, or Firm* — Oblon, McClelland, Maier & Neustadt, L.L.P.

(57) ABSTRACT

According to one embodiment, a coaxial cable includes a core wire, a plurality of sheaths which are tubular and made of metal and coaxially cover the core wire, a powdered insulating material which is filled between the core wire and an innermost sheath and between the plurality of sheaths, respectively, a first airtight portion which hermetically seals between the core wire and an inner sheath, and a second airtight portion which hermetically seals between the inner sheath and the sheath on an outer side of the inner sheath.

4 Claims, 3 Drawing Sheets

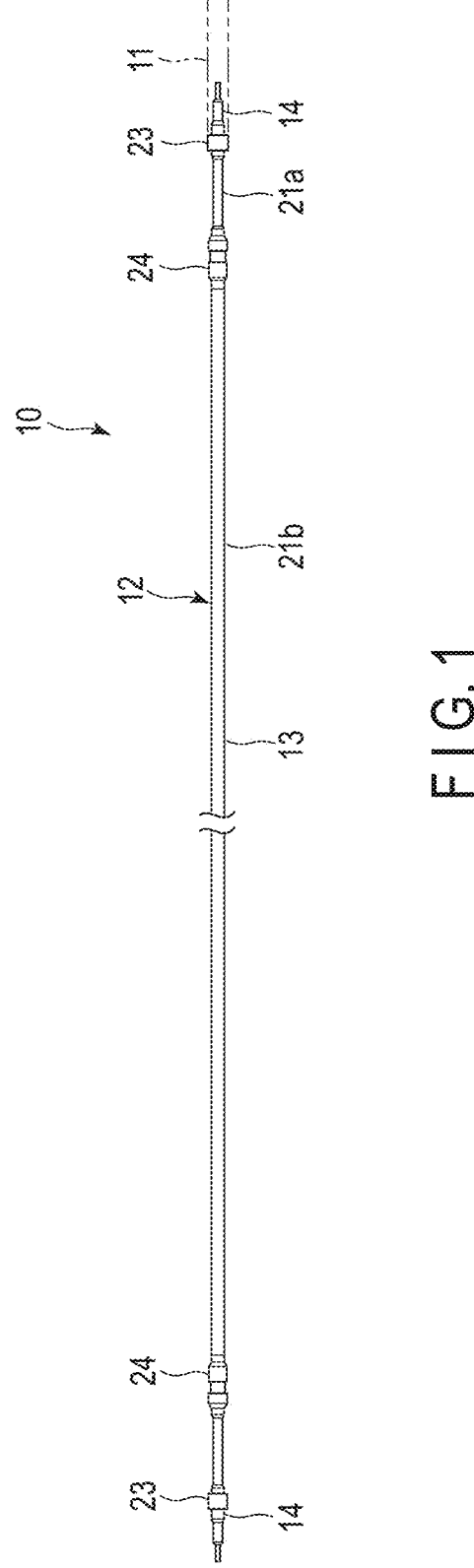
F I G. 1

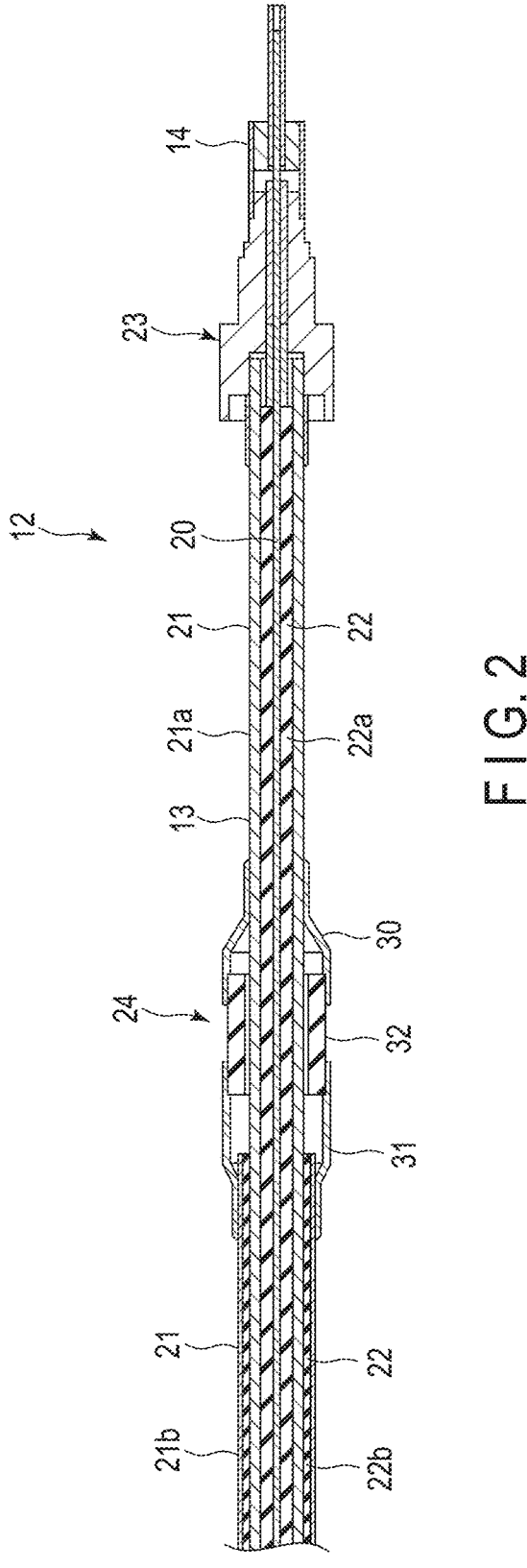
F I G. 2

COAXIAL CABLE AND RADIATION DETECTOR

CROSS-REFERENCE TO RELATED APPLICATIONS

This application is a Continuation Application of PCT Application No. PCT/JP2022/011182, filed Mar. 14, 2022 and based upon and claiming the benefit of priority from Japanese Patent Application No. 2021-201436, filed Dec. 13, 2021, the entire contents of all of which are incorporated herein by reference.

FIELD

Embodiments described herein relate generally to coaxial cables and radiation detectors.

BACKGROUND

A coaxial cable is used as a signal transmission cable for a radiation detector that performs pulse measurements in a strong radiation environment. This coaxial cable has a core wire at the center, a metallic tubular sheath is arranged to surround this core wire, and a powdered insulating material is filled between the core wire and the sheath. In addition, there is a coaxial cable with a double sheath structure in which a second metallic tubular sheath is arranged to surround a first sheath, and a powdered insulating material is filled between the first sheath and the second sheath.

For the coaxial cable with a double sheath structure, that between the first sheath and the second sheath may be an open state. This is because even if that between the first sheath and the second sheath is the open state, electrical floating is realized if insulation resistance is equal to or higher than a predetermined value; therefore, little effect is caused on the generation of signal noise.

However, in environments susceptible to humidity, when that between the first sheath and the second sheath is the open state, moisture may enter from outside into a gap in the powdered insulating material filled between the first sheath and the second sheath, lowering insulation resistance and causing the generation of signal noise.

BRIEF DESCRIPTION OF THE DRAWINGS

FIG. 1 is a side view of a radiation detector comprising a coaxial cable showing a first embodiment.

FIG. 2 is an enlarged cross-sectional view of the coaxial cable.

DETAILED DESCRIPTION

Figure 3:
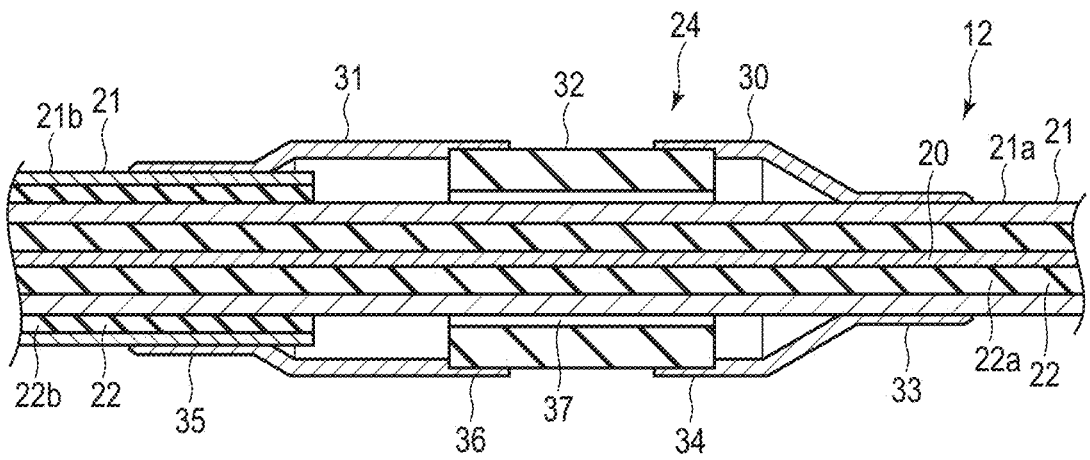
FIG. 3 is an enlarged cross-sectional view of a second airtight portion of the coaxial cable.

Embodiments will be described hereinafter with reference to the accompanying drawings.

In general, according to one embodiment, a coaxial cable comprises a core wire, a plurality of metallic tubular sheaths that coaxially cover the core wire, a powdered insulating material that is filled between the core wire and an innermost sheath and between the plurality of sheaths, respectively, a first airtight portion that hermetically seals between the core wire and the innermost sheath, and a second airtight portion that hermetically seals between an inner sheath and a sheath on an outer side of the inner sheath.

Throughout the embodiments, common elements are denoted by like reference numerals, and a detailed description thereof may be omitted unless otherwise necessary. Further, in order to make the description clearer, the widths, thicknesses, shapes, etc., of the respective parts are schematically illustrated in the drawings, compared to the actual modes. These parts can be redesigned or remodeled as needed with reference to the following descriptions and the conventional techniques.

A first embodiment will be described below with reference to FIG. 1 to FIG. 3.

FIG. 1 shows a radiation detector 10 that detects radiation, such as neutrons. The radiation detector 10 comprises a detector body 11 that detects radiation and a coaxial cable 12 that transmits electrical signals generated in response to the detection of radiation by the detector body 11 to a measuring instrument or the like.

The detector body 11 has a cathode and an anode arranged in a tubular sealed container, which is also filled with ionizing gas. It is configured so that when radiation enters the sealed container, the ionizing gas is ionized, and ionized electrons are collected at the anode, generating an electrical signal at the anode.

The coaxial cable 12 is an inorganic coaxial cable that can be used in a radiation environment and transmits the electrical signal generated at the anode of the detector body 11 to a measuring instrument and the like. The coaxial cable 12 comprises a cable portion 13 and connector portions 14 provided at both ends of the cable portion 13. The connector portions 14 are attached to the detector body 11 or the measuring instrument.

As shown in FIG. 2, the coaxial cable 12 comprises a core wire 20, a plurality of sheaths 21 covering the core wire 20 in a coaxial or concentric circular form, a powdered insulating material 22 filled between the core wire 20 and the sheaths 21 and between a plurality of sheaths 21, respectively, a first airtight portion 23 to hermetically seal between the core wire 20 and the innermost sheath 21 at both end portions of the innermost sheath 21, respectively, and a second airtight portion 24 to hermetically seal between the inner sheath 21 and both end portions of the sheath 21 on the outer side of this inner sheath 21, respectively. The coaxial cable portion 13 is configured by the core wire 20, the plurality of sheaths 21, and the insulating material 22.

The core wire 20 is a conductor for which, for example, a thin wire made of copper is used. The core wire 20 is electrically connected to the anode of the detector body 11 and transmits electrical signals generated at the anode in response to the detection of radiation at the detector body 11 to a measuring instrument or the like.

The sheath 21 includes an inner sheath 21a, which is a first (first layer) inner sheath that covers, in a manner surrounding, the core wire 20, and an outer sheath 21b, which is a second (second layer) outer sheath that is larger in diameter than the inner sheath 21a and covers, in a manner surrounding, the inner sheath 21a. The inner sheath 21a and the outer sheath 21b are arranged coaxially with respect to the core wire 20 through the insulating material 22. The inner sheath 21a and the outer sheath 21b are made of, for example, metal, such as stainless steel, and are formed in a tubular or cylindrical or pipe-like shape. Note that, in the present embodiment, the thickness of the inner sheath 21a is thicker than that of the outer sheath 21b, however, the thickness of the outer sheath 21b may be thicker than that of the inner sheath 21a, or the thickness of the inner sheath 21a and that of the outer sheath 21b may be the same.

The outer sheath 21b is arranged in an area in a longitudinal direction (axial direction) of the coaxial cable 12 in which at least shielding performance is desired to be ensured. In the present embodiment, for example, in a case where one end portion of the coaxial cable 12 is arranged together with the detector body 11 in a device or the like to be detected for radiation, the other end portion of the coaxial cable 12 is arranged in a measuring instrument or the like, and a middle portion of the coaxial cable 12 is exposed to a radiation environment, the outer sheath 21b is arranged on the middle portion between both end portions of the coaxial cable 12, and only the inner sheath 21a is arranged on both end portions of the coaxial cable 12. The length of the outer sheath 21b in the longitudinal direction is shorter than that of the inner sheath 21a, and a double sheath structure in which only the middle portion of the coaxial cable 12 is covered by the outer sheath 21b, and a single sheath structure in which both end portions of the coaxial cable 12 are not covered by the outer sheath 21b are provided. Furthermore, the length of the inner sheath 21a is shorter than that of the core wire 20, both end portions of the core wire 20 protrude from both end portions of the inner sheath 21a, and both end portions of the core wire 20 are arranged in the connector portion 14.

The insulating material 22 is configured by an inorganic insulating material such as $Al_2O_3$ or $SiO_2$ in powder form. The insulating material 22 includes a first (first layer) inner insulating material 22a, which is filled between the core wire 20 and the inner sheath 21a, and a second (second layer) outer insulating material 22b, which is filled between the inner sheath 21a and the outer sheath 21b. Each of the insulating materials 22a and 22b is held in a tubular shape in a filled state, arranges the inner sheath 21a and the outer sheath 21b coaxially with respect to the core wire 20, and ensures a predetermined insulation resistance of approximately $1 \times 10^5 \Omega$ or greater between the core wire 20 and the inner sheath 21a and between the inner sheath 21a and the outer sheath 21b.

The first airtight portion 23 holds the end portion of the core wire 20 and the end portion of the inner sheath 21a in an electrically insulated state at both end portions of the coaxial cable 12, and hermetically seals between the core wire 20 and the inner sheath 21a filled with the inner insulating material 22a. The first airtight portion 23 may also serve as the connector portion 14 attached to the detector body 11 or the measuring instrument. The connector portion 14 attached to the detector body 11 electrically connects the core wire 20 to the anode of the detector body 11. The first airtight portion 23 is attached to the end portion of the cable portion 13 after the second airtight portion 24 is attached to the cable portion 13.

As shown in FIG. 3, the second airtight portion 24 is attached between the inner sheath 21a and the end portion of the outer sheath 21b and hermetically seals between the inner sheath 21a and the outer sheath 21b filled with the outer insulating material 22b. The second airtight portion 24 has a first mounting portion 30 made of, for example, metal, such as stainless steel, which is attached hermetically to the circumference of the inner sheath 21a, a second mounting portion 31 made of, for example, metal, such as stainless steel, which is attached hermetically to the circumference of the outer sheath 21b which is a sheath on the outer side of the inner sheath 21a to which the first mounting portion 30 is attached, and an insulating portion 32 which hermetically connects the first mounting portion 30 and the second mounting portion 31 in an electrically insulated manner.

The first mounting portion 30 is cylindrical or tubular, and has an inner sheath mounting portion 33 with a smaller diameter at one end corresponding to the outer diameter of the inner sheath 21a, and an insulating portion mounting portion 34 with a larger diameter than the one end at the other end corresponding to the outer diameter of the insulating portion 32. The insulating portion mounting portion 34 of the first mounting portion 30 is hermetically attached to the circumference of the insulating portion 32 by brazing, for example.

The second mounting portion 31 is cylindrical or tubular, and has an outer sheath mounting portion 35 with a smaller diameter at one end corresponding to the outer diameter of the outer sheath 21b, and an insulating portion mounting portion 36 with a larger diameter than the one end at the other end corresponding to the outer diameter of the insulating portion 32. The insulating portion mounting portion 36 of the second mounting portion 31 is hermetically attached to the circumference of the insulating portion 32 by brazing, for example.

The insulating portion 32 is a molded product sintered and formed into a cylindrical shape with an inorganic insulating material such as $Al_2O_3$ or $SiO_2$. At the center of the insulating portion 32 is an insertion hole 37, which is larger than the outer diameter of the inner sheath 21a and through which the inner sheath 21a is inserted. The outer diameter of the insulating portion 32 is larger than that of the outer sheath 21b. On both end portions of the circumference of the insulating portion 32, the insulating portion mounting portion 34 of the first mounting portion 30 and the insulating portion mounting portion 36 of the second mounting portion 31 are hermetically attached by brazing, for example.

The second airtight portion 24 is inserted into the inner sheath 21a from each end portion side of the cable portion 13, the outer sheath mounting portion 35 of the second mounting portion 31 is inserted into the outer sheath 21b, the inner sheath mounting portion 33 of the first mounting portion 30 is hermetically attached to the circumference of the inner sheath 21a by welding or brazing, for example, and the outer sheath mounting portion 35 of the second mounting portion 31 is hermetically attached to the circumference of the outer sheath 21b by welding or brazing, for example.

The second airtight portion 24 hermetically seals between the inner sheath 21a and the outer sheath 21b filled with the outer insulating material 22b, and can prevent external moisture from entering a gap in the powdered outer insulating material 22b. Therefore, the decrease in insulation resistance of the outer insulating material 22b can be suppressed, and the generation of signal noise can be reduced.

Once moisture has entered between the sheaths 21 of the coaxial cable 12, it becomes a cause of generating signal noise over a long period of time until the moisture is removed. Furthermore, although it is possible to recover the coaxial cable 12 by heating the coaxial cable 12 as a means of removing moisture, it takes a lot of time to remove the moisture; however, such problem can be solved by adding the second airtight portion 24.

Since the second airtight portion 24 has a configuration comprising the metal first mounting portion 30 that is hermetically attached to the inner sheath 21a, the metal second mounting portion 31 that is hermetically attached to the outer sheath 21b, which is the sheath 21 on the outer side of the inner sheath 21a to which the first mounting portion 30 is attached, and the insulating portion 32 that hermetically connects the first mounting portion 30 and the second mounting portion 31 in an electrically insulating manner, the inner sheath 21*a* and the outer sheath 21*b* can be electrically separated while ensuring airtightness between the inner sheath 21*a* and the outer sheath 21*b*.

Although the second airtight portion 24 can achieve a moisture-proof effect and ensure the insulation of the outer insulating material 22*b* simply by hermetically sealing between the inner sheath 21*a* and the outer sheath 21*b* filled with the outer insulating material 22*b*, the inside of the second airtight portion 24 can be vacuumed or replaced with an inert gas to enhance the insulation of the outer insulating material 22*b*.

Figure 4:
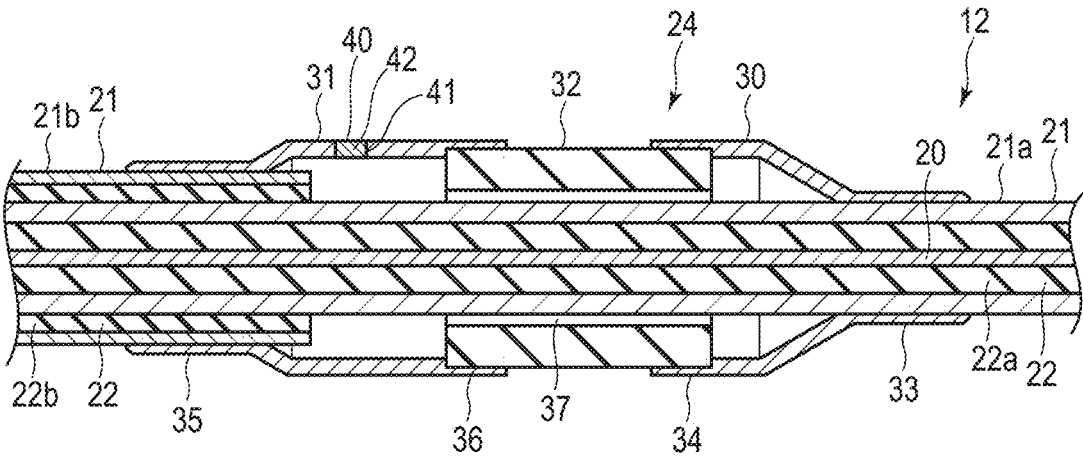
FIG. 4 is an enlarged cross-sectional view of a second airtight portion of a coaxial cable showing a second embodiment.

In this case, as in a second embodiment shown in FIG. 4, a second airtight portion 24 may be configured to have a displacement sealing portion 40 in which gas interposed between an inner sheath 21 and a sheath 21 on the outer side of this inner sheath 21 is sealed in a state of being replaced by another gas.

In the displacement sealing portion 40, a displacement hole 41 is provided in a part of a second mounting portion 31 (or a first mounting portion 30), the gas inside the second airtight portion 24 and between an inner sheath 21*a* and an outer sheath 21*b* is removed through this displacement hole 41 to create a vacuum state, then, inert gas such as argon or nitrogen is filled inside the second airtight portion 24 and between the inner sheath 21*a* and the outer sheath 21*b* through the displacement hole 42, and finally the displacement hole 41 is sealed by a sealing plug 42.

Note that the second airtight portion 24 may be formed solely of insulating material and attached hermetically to the inner sheath 21*a* and the outer sheath 21*b*, respectively, to ensure airtightness and to electrically separate the inner sheath 21*a* and the outer sheath 21*b*.

The outer sheath 21*b* and an outer insulating material 22*b* may be extended to the end portion or near the end portion of the inner sheath 21*a*. In this case, a first airtight portion 23 and the second airtight portion 24 may be provided as one piece.

The coaxial cable 12 had a double sheathed structure with the inner sheath 21*a* and the outer sheath 21*b*; however, it may also have a triple or more sheathed structure with the sheath 21 arranged in a coaxial manner. In this case, a separate second airtight portion 24 may be used to hermetically seal each overlap, such as between the first sheath 21 and the second sheath 21 and between the second sheath 21 and the third sheath 21, or one second airtight portion 24 may hermetically seal between the inner sheath 21*a* and the outermost sheath 21, such as the third sheath 21, collectively.

The coaxial cable 12 can also be used as a signal transmission cable in addition to the radiation detector 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A coaxial cable comprising:
   a core wire;
   a plurality of sheaths that are tubular and made of metal and coaxially cover the core wire;
   a powdered insulating material filled between the core wire and an innermost sheath, and between the plurality of sheaths, respectively;
   a first airtight portion that hermetically seals between the core wire and the innermost sheath; and
   a second airtight portion that hermetically seals between an inner sheath and the sheath on an outer side of the inner sheath, wherein
   the second airtight portion includes a first mounting portion made of metal that is hermetically attached to the inner sheath, a second mounting portion made of metal that is hermetically attached to the sheath on the outer side of the inner sheath to which the first mounting portion is attached, and an insulating portion that hermetically connects the first mounting portion and the second mounting portion in an electrically insulated manner.

2. The coaxial cable of claim 1, wherein the second airtight portion includes a displacement sealing portion in which a gas interposed between the inner sheath and the sheath on the outer side of the inner sheath is sealed in a state of being replaced by another gas.

3. A radiation detector comprising a coaxial cable,
   the coaxial cable comprising:
   a core wire;
   a plurality of sheaths that are tubular and made of metal and coaxially cover the core wire;
   a powdered insulating material filled between the core wire and an innermost sheath, and between the plurality of sheaths, respectively;
   a first airtight portion that hermetically seals between the core wire and the innermost sheath; and
   a second airtight portion that hermetically seals between an inner sheath and the sheath on an outer side of the inner sheath, wherein
   the second airtight portion includes a first mounting portion made of metal that is hermetically attached to the inner sheath, a second mounting portion made of metal that is hermetically attached to the sheath on the outer side of the inner sheath to which the first mounting portion is attached, and an insulating portion that hermetically connects the first mounting portion and the second mounting portion in an electrically insulated manner.

4. The radiation detector of claim 3, wherein the second airtight portion includes a displacement sealing portion in which a gas interposed between the inner sheath and the sheath on the outer side of the inner sheath is sealed in a state of being replaced by another gas.

* * * * *